United States Patent [19]
Branecky et al.

[11] Patent Number: 5,457,374
[45] Date of Patent: Oct. 10, 1995

[54] MOTOR CONTROLLER FOR OPERATING AN INVERTER IN CURRENT-CONTROLLED AND VOLTAGE-CONTROLLED MODES

[75] Inventors: Brian T. Branecky, Huntington Beach; Edward L. Johnson, Torrance, both of Calif.

[73] Assignee: AlliedSignal Inc., Morris Township, N.J.

[21] Appl. No.: 111,346

[22] Filed: Aug. 24, 1993

[51] Int. Cl.⁶ ........................................ H02P 5/34
[52] U.S. Cl. .................... 318/801; 318/823; 318/805; 318/798; 318/822; 388/806; 388/821
[58] Field of Search ..................... 318/801, 805, 318/798, 822, 823; 388/806, 821, 916

[56] References Cited

U.S. PATENT DOCUMENTS

| | | | |
|---|---|---|---|
| 4,037,144 | 7/1977 | Ohmae et al. | 318/801 |
| 4,315,203 | 2/1982 | Ibamoto et al. | 318/801 |
| 4,879,502 | 11/1989 | Endo et al. | 318/801 |
| 5,166,585 | 11/1992 | Kobaragi et al. | 318/806 |

Primary Examiner—William M. Shoop, Jr.
Assistant Examiner—Karen Masih
Attorney, Agent, or Firm—John R. Rafter

[57] ABSTRACT

A motor controller for brushless motors operates an inverter in a current-controlled mode for low motor speeds and in a voltage-controlled mode for high motor speeds. By switching from the current-controlled mode to the voltage-controlled mode at higher speeds, the motor can be designed at maximum efficiency, and minimum weight, cost and volume.

8 Claims, 4 Drawing Sheets

5,457,374

MOTOR CONTROLLER FOR OPERATING AN INVERTER IN CURRENT-CONTROLLED AND VOLTAGE-CONTROLLED MODES

BACKGROUND OF THE INVENTION

This invention relates in general to electric motor systems and in particular to controllers for brushless motors.

Brushless dc motors are rising in popularity. Originally intended for servo applications and robotics, these motors are now replacing ac motors and conventional dc motors in high-speed applications, slow-speed direct-drive applications and any other applications that require speed control.

A brushless dc motor typically includes a permanent magnet rotor surrounded by stator windings. A controller commands an inverter to energize the stator windings in a sequence that creates a rotating stator magnetomotive (mmf) vector. The resulting torque reaction between the stator mmf vector and the rotor's flux vector causes the rotor to rotate. Motor torque is proportional to the amount of current flowing through the windings. The current is regulated by pulse-width modulating the solid-state switches of the inverter.

The inverter is typically operated in a current-controlled mode. In this mode, only two-phase windings are energized at any given time, except at the "commutation time" when current in one phase winding is being reduced to zero. Commutation information is derived from rotor position sensors or in some cases, the so-called back emf of the motor. This commutation information allows the controller to energize the windings in the correct sequence. The current-controlled motor of operation is preferred because the motor is simple to control.

Several disadvantages of operating the inverter in the current-controlled mode become apparent with increases in the rotational speed of the motor rotor. As the rotor rotates, its magnetic field interacts with the stator windings causing a back emf to be generated. As motor speed increases, a phase shift develops between the current in the phase windings and motor back emf. This phase shift reduces the effective power factor at which the motor operates. To correct for this reduction, the effective inductance (referred to as the commutation inductance) of the machine can be reduced; however, such a reduction increases peak-to-peak ripple in the stator windings requiring a higher KVA rating of the inverter. To reduce the ripple, the switching frequency can be increased. However, switching losses are proportional to switching frequency; therefore, efficiency for the drive would be reduced.

SUMMARY OF THE INVENTION

The foregoing disadvantages are overcome by a motor controller which operates the inverter in the current-controlled mode for low motor speeds and in a voltage-controlled mode for high motor speeds. The motor controller generates commands in a voltage controlled mode and commands in a current controlled mode. The controller selects the appropriate mode for the operating conditions. This motor controller allows the motor weight, cost and volume to be minimized and motor efficiency to be maximized.

DETAILED DESCRIPTION OF THE PREFERRED EMBODIMENT

Figure 1:
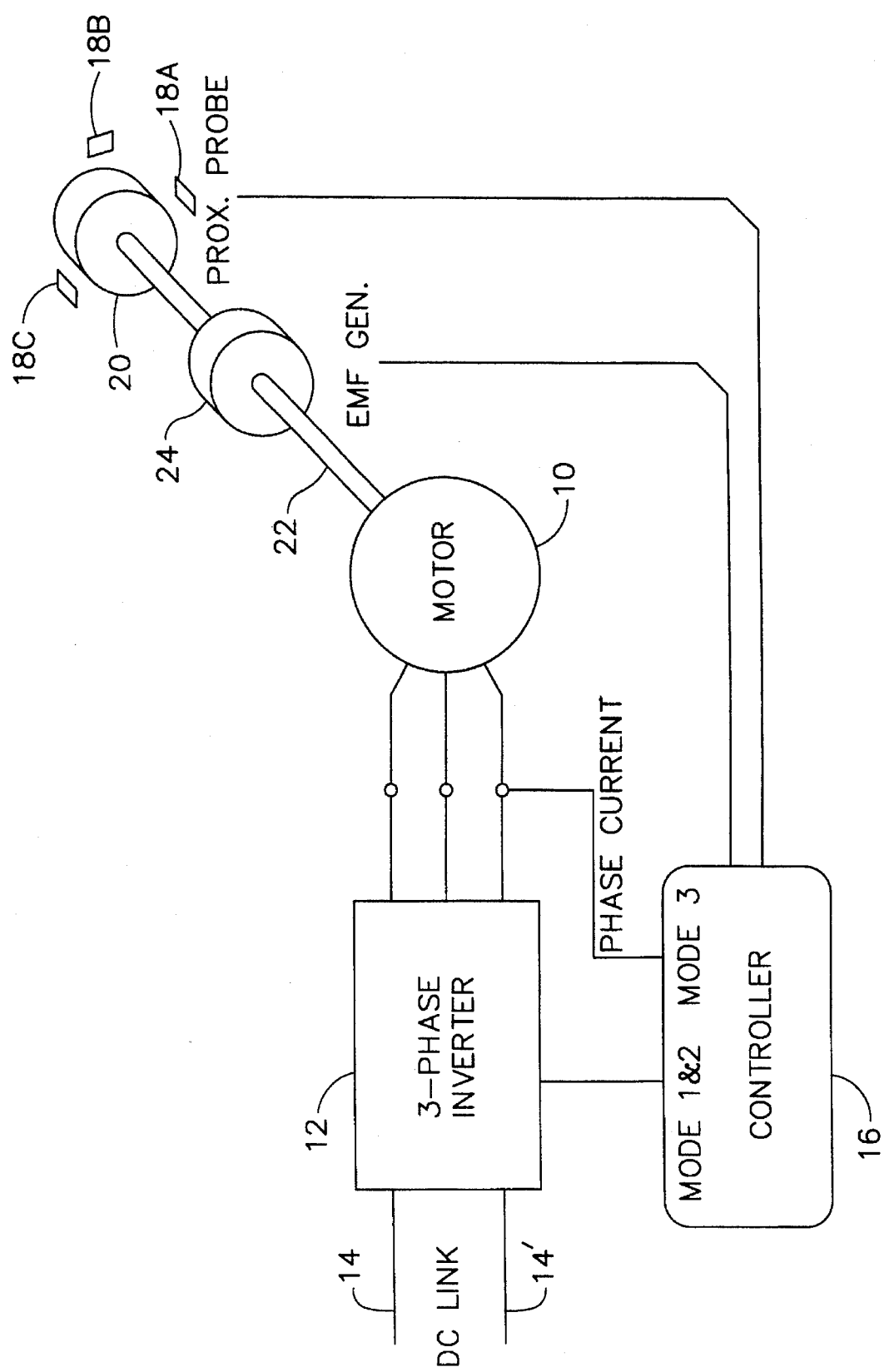
FIG. 1 is a block diagram of a brushless motor, inverter, and motor controller according to the present invention.

FIG. 1 shows a brushless motor 10 having a permanent magnet rotor that is surrounded by a stator. Brushless motors can have any number of phase windings greater than one. However, the three-phase motor is most common. Accordingly, the present invention will be described in connection with a motor having three-phase windings A, B, and C (not shown).

A solid-state inverter 12, supplied with dc power from a dc link high 14 and dc link return 14', commutates power to the motor 10. The inverter 12 is of conventional construction and includes an upper and lower switch for each phase winding of the motor. The upper switch couples its phase winding to a dc link high, and the lower switch couples its phase winding to a dc link return. Each switch can be formed from a single transistor or from a plurality of transistors connected in parallel. The transistor can be bipolar (e.g., IGBT) or field-effect (e.g., DMOS).

The switches are commanded by commutation commands which are supplied by a motor controller 16 according to the present invention.

The controller 16 operates the motor 10 in a current-controlled mode for motor speeds between 0 and approximately 50% of maximum rated speed. For a conventional current-controlled inverter, operating at a fixed current limit, as the back emf of the motor increases, the fundamental motor current is reduced and a phase shift occurs between the back emf and the fundamental current. Both the reduction in fundamental current and the phase shift reduce the torque that can be obtained for a given current limit as the motor speed increases.

At speeds greater than 50% of maximum rated speed, the motor 10 is operated in a voltage-controlled mode. In this mode, the commutation commands cause a switch for each phase winding to be "on" at the same, except during commutation time. Supplied to each phase winding is a high frequency, square wave voltage waveform. Typically, this high-frequency modulation is many times greater than the fundamental sinusoidal frequency. The average value of the square wave over one cycle approximates the average value of the sinusoidal wave at that time. For a three-phase motor, three "sine waves" for the three-phase windings are phase displaced by 120° relative to each other.

Transferring from a current-controlled mode to a voltage-controlled mode enables more torque at higher speeds to be achieved than is possible with the conventional current-controlled inverter. The exact speed of the transition from current-controlled mode to voltage-controlled mode is dependent upon the dc link voltage, the commutation inductance, the motor back emf, and the maximum torque required from the motor.

Figure 2:
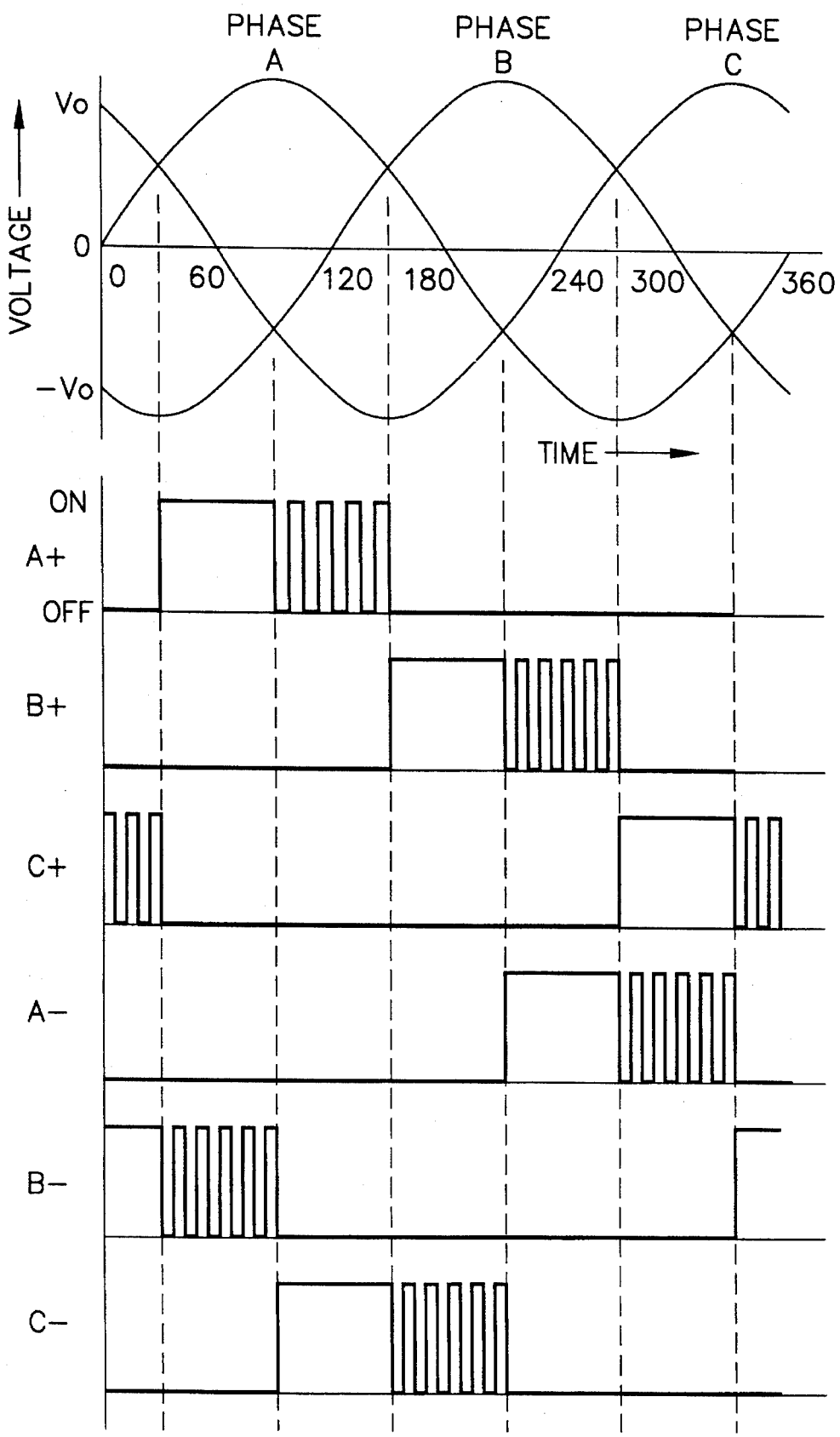
FIG. 2 shows commutation commands generated by the controller for the current-controlled mode and the commutation commands for the six transistor switches in the inverter.

When the motor is operated in the current-controlled mode, the commutation commands are generated according to the position signals POSA, POSB, POSC see FIG. 2. Rotor position signals POSA, POSB and POSC are generated by three proximity probes 18A, 18B and 18C that displaced about a target 20 by 120 electrical degrees from one another. In this arrangement, the target 20 rotates through sensor 18A when no-load motor phase A is greater than phase C. The rotor position signals POSA, POSB, POSC must indicate rotor position in increments of 60 electrical degrees.

As the number of phases increases, the number of probes will also change. The number of probes will typically be an integral product of the number of phases.

Instead of proximity probes, the signals POSA, POSB, POSC can be generated by three Hall effect devices (not shown) placed inside the stator and positioned such that their outputs reflect position signal POSA. The use of Hall effects devices eliminates the need for analog circuit decoding, external targets, generators, and proximity probes attached to the shaft 22 of the motor 10.

Alternatively, the controller 16 can generate the commutation commands according to back emf signals EMFA, EMFB, EMFC. These signals could be supplied to a no-load generator coupled to the shaft 22 of the motor 10.

Phase currents CURA, CURB, and CURC from the phase windings A, B, and C are sensed with transductors or other current sensing devices. The phase currents CURA, CURB, and CURC, along with their polarities, are utilized for overcurrent protection and ground fault detection.

Thus, when the motor is operated in the current-controlled mode, motor speed is controlled by regulating the amount of current in the phase windings. The current, in turn, is regulated by pulse width modulating the switches of the inverter 12.

Figure 3:
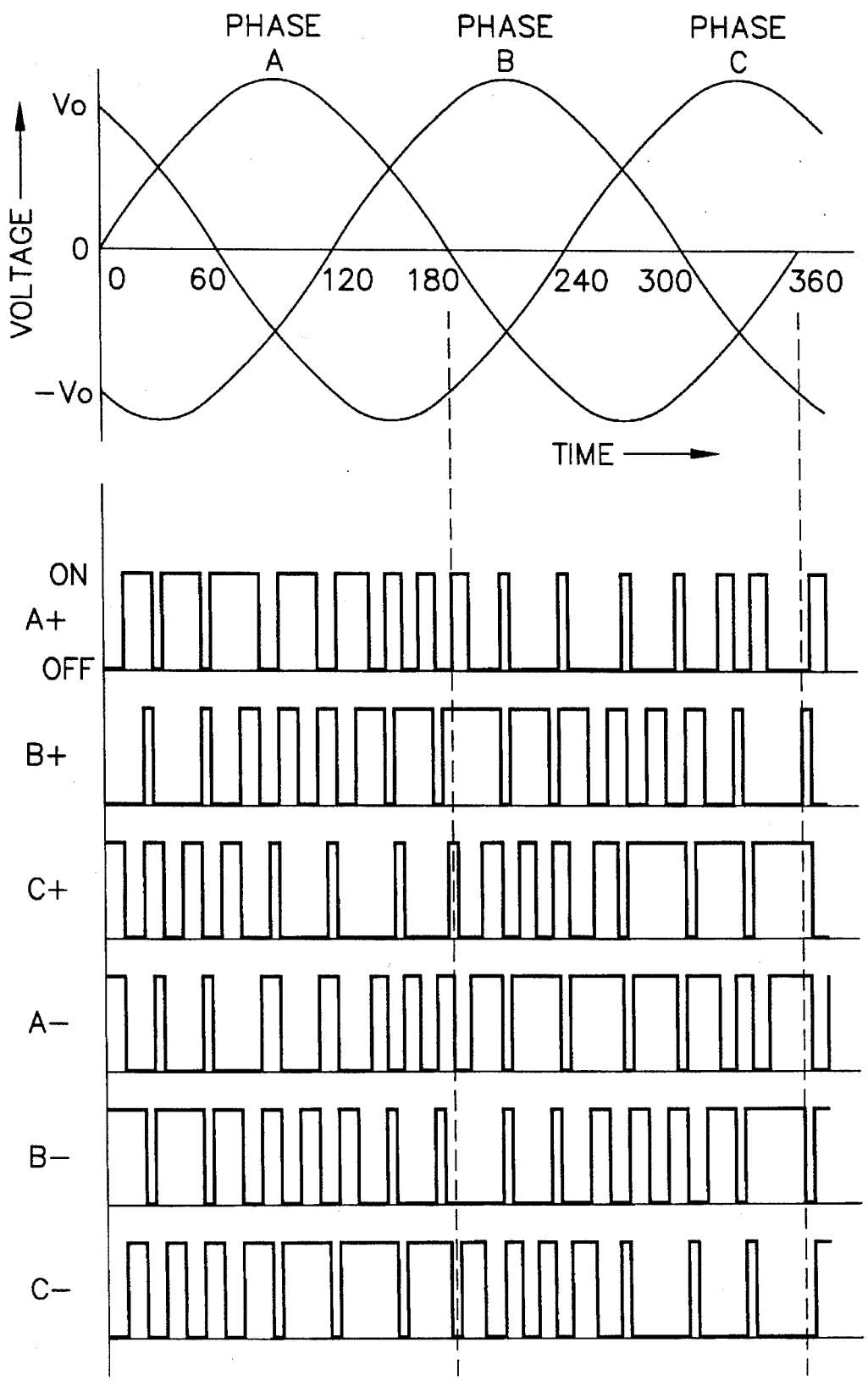
FIG. 3 shows commutation commands generated by the controller for the voltage-controlled mode.

When the motor is operated in the voltage-controlled mode, the commutation commands are phase-locked to the position signals POSA, POSB, POSC or back emf signals EMFA, EMFB, EMF as shown in FIG. 3. Motor speed is controlled by varying the phase angle between the commutation commands and the back emf or position signals.

Figure 4:
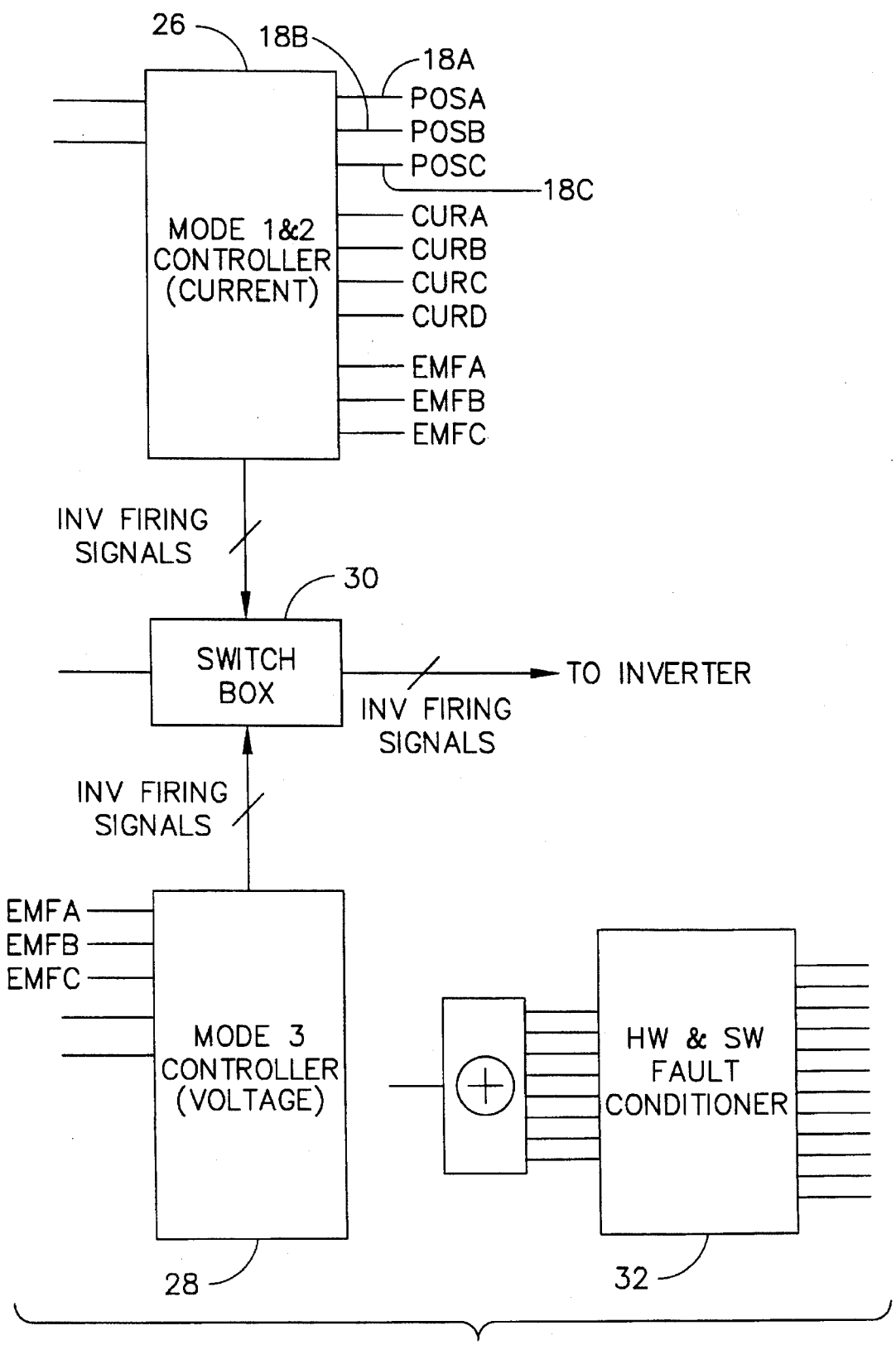
FIG. 4 is a block diagram of the motor controller shown in FIG. 1.

Referring now to FIG. 4 which is a block diagram of the motor controller 16 which includes a first digital motor controller (DMC) 26 for operating the inverter 12 in the current-controlled mode, a second DMC 28 for operating the inverter 12 in the voltage-controlled mode, and a switch box 30 for switching between the first and second controllers 26 and 28. The first DMC 26 includes a digital signal processor which generates commutation commands in response to the position feedback signals POSA, POSB, POSC. One such DMC 26 is disclosed in Mendenhall U.S. Pat. No. 4,631,459, which is incorporated herein by reference. Another such DMC 26 is disclosed in U.S. Ser. No. 07/724,647 filed on Jul. 10, 1991 and assigned to Allied-Signal, Inc., the assignee of the present invention. This application is also incorporated by reference.

The second DMC 28 includes a digital signal processor which generates commutation commands in response to the back emf signals EMFA, EMFB, EMFC. The commutation commands from the second DMC 28 are phase-locked to the back emf signals EMFA, EMFB, and EMFC from the emf generator 24 or to position signals POSA, POSB, POSC. One such DMC 28 is disclosed in Itani et al. U.S. Pat. No. 4,698,744, which is incorporated herein by reference.

Both DMC's will generate the commutation commands at the same time, however only one is selected, based upon the speed of the motor.

The switch 30 selects the commutation commands from one of the DMCS 26 or 28 and supplies the selected commands to the gates of the FETS in the inverter 12.

The hardware switch 30 is controlled by software in DMC 28. DMC 28 calculates the motor speed feedback and uses the following logic in determining the state of the switch: For motor speeds less than 50% of max, DMC 26 is connected to the inverter and for motor speed greater than 50% DMC 28 is connected to inverter.

The first controller 26, second controller 28 and switch box 30 may be combined in a single digital signal processor.

Thus disclosed is a motor controller 16 which operates an inverter 12 in a current-controlled mode for low motor speeds and in a voltage-controlled mode for high motor speeds. Design of the inverter 12, motor 10, and controller 16 is optimized to achieve the lowest weight and volume, the highest efficiency, and the lowest cost. The motor's commutation reactance is maximized to eliminate the need for external inductance that might otherwise be required to limit the ripple current in the motor. To accomplish this design, motor parameters such as length of the motor, channels of the motor, and number of turns per phase are adjusted to achieve the results. To those skilled in the art of motor design, this is well understood. This, in turn, reduces weight. Further, by increasing the inductance in the motor 10, the load angle required to obtain rated torque is increased, providing for higher torque resolution.

The switching frequency of the inverter 12, coupled with the motor leakage/synchronous impedance and methodology of control are optimized to increase efficiency of the system. Switching losses of power semiconductor switches are proportional to the current and switching frequency. To minimize these losses, it is normal, by those skilled in the art, to limit peak-to-peak ripple current; such switching frequency reduction improves the overall efficiency of the system by decreasing switching losses of the inverter.

The torque and speed control method described for the voltage-controlled mode of operation optimizes system weight by designing inductance into the motor rather than adding inductance as a separate component. Similarly, thermal losses are minimized by selecting the switching frequency based upon the motor inductance. System weight is optimized by designing the components of the inverter and motor as a system rather than attempting to optimize the motor weight and accept the penalty of the controller/inverter required to operate it.

Digital controllers are preferred over analog controllers because they have fewer components and lower cost, and they are insensitive to temperature drift that analog systems are renowned for. Nevertheless, analog controllers can be employed instead. Exemplary analog controllers include Fujioka U.S. Pat. No. 4,631,459 (an analog controller for the current-controlled mode) and Miyazaki U.S. Pat. No. 4,808,902 (an analog controller for the voltage-controlled mode). Both of these patents are incorporated herein by reference.

It will be understood that the embodiment described herein is merely exemplary and that a person skilled in the art may make many variations and modifications without departing from the spirit and scope of the invention. All such variations and modifications are intended to be included within the scope of the invention as defined in the appended claims.

We claim:

1. A system comprising:

a brushless electric motor having a rotor and a stator;

inverter means for commutating power to said motor which is synchronous with the motor; position feedback means for providing at least one feedback signal indicating the position of said rotor relative to said stator;

first motor controller means, responsive to said at least one feedback signal, for generating first commutation commands corresponding to a current-controlled mode of operation;

second motor controller means, responsive to said at least one feedback signal, for generating second commutation commands corresponding to a voltage-controlled mode of operation; and selecting means, responsive to said first and second motor controller means, for supplying said first commutation commands when motor speed is below a threshold and supplying said second commutation commands when said motor speed is above said threshold to said inverter means.

2. The system of claim 1, wherein said position feedback means includes position sensor means for providing position signals indicating said rotor position, and back emf means for generating emf signals indicating back emf of said motor.

3. The system of claim 2, wherein said back emf means includes no-load generator means, mechanically coupled to said motor for generating said emf signals.

4. The system of claim 1, wherein said threshold is approximately 50% of maximum rated motor speed.

5. The system of claim 1, wherein said first and second controllers are digital motor controllers.

6. The system of claim 5, wherein said first and second motor controller means includes first and second microprocessors for generating first and second commutation commands.

7. The system of claim 1, wherein said first and second controllers are analog motor controllers.

8. The system of claim 1, wherein said motor has a relatively high inductance.

* * * * *